US011272146B1

(12) United States Patent
Pan (10) Patent No.: US 11,272,146 B1
(45) Date of Patent: Mar. 8, 2022

(54) CONTENT ADAPTIVE LENS SHADING CORRECTION METHOD AND APPARATUS

(71) Applicant: JinYun Pan, Shanghai (CN)

(72) Inventor: JinYun Pan, Shanghai (CN)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 17/022,721

(22) Filed: Sep. 16, 2020

(30) Foreign Application Priority Data

Aug. 28, 2020 (CN) .......................... 202010886575.3

(51) Int. Cl.
| | |
|---|---|
| *H04N 9/04* | (2006.01) |
| *H04N 9/64* | (2006.01) |
| *H04N 9/77* | (2006.01) |
| *H04N 17/00* | (2006.01) |
| *H04N 5/243* | (2006.01) |
| *H04N 5/357* | (2011.01) |
| *H04N 9/73* | (2006.01) |

(52) U.S. Cl.
CPC ......... *H04N 9/04517* (2018.08); *H04N 5/243* (2013.01); *H04N 5/3572* (2013.01); *H04N 9/643* (2013.01); *H04N 9/646* (2013.01); *H04N 9/735* (2013.01); *H04N 9/77* (2013.01); *H04N 17/002* (2013.01)

(58) Field of Classification Search
CPC .... H04N 9/04517; H04N 9/643; H04N 9/646; H04N 9/77; H04N 5/243; H04N 5/3572; H04N 17/002
See application file for complete search history.

(56) References Cited

U.S. PATENT DOCUMENTS

| | | | |
|---|---|---|---|
| 7,453,502 | B2 | 11/2008 | Schweng |
| 7,538,806 | B2 | 5/2009 | Kawakami et al. |
| 7,548,262 | B2 | 6/2009 | Nikkanen et al. |
| 7,609,305 | B2 | 10/2009 | Fainstain et al. |
| 8,194,159 | B2 | 6/2012 | Wang |
| 8,228,406 | B2 | 7/2012 | Kuo |
| 8,350,951 | B2 | 1/2013 | Terasawa |
| 8,577,140 | B2 | 11/2013 | Demandolx |
| 8,587,703 | B2 | 11/2013 | Lelescu |

(Continued)

FOREIGN PATENT DOCUMENTS

WO 2016/065632 A1 5/2016

OTHER PUBLICATIONS

U.S. Patent and Trademark Office; Non-Final Rejection; U.S. Appl. No. 15/958,183; dated Jun. 28, 2019.

(Continued)

*Primary Examiner* — Brian P Yenke (57) ABSTRACT

Methods and apparatus for providing adaptive lens shading correction in at least a portion of a shaded image frame perform luminance lens shading correction for a portion of the shaded image frame and detect a color flat area in the shaded image. The methods and apparatus generate a frequency-based color shading profile that includes color shading parameters including an amplitude parameter and phase parameter corresponding to hue distributions from experimental shading data and generate an unshaded image by performing color shading correction on the detected color flat areas of the shaded image frame using the color shading parameters.

20 Claims, 7 Drawing Sheets

(56) References Cited

U.S. PATENT DOCUMENTS

| | | |
|---|---|---|
| 8,749,662 B2 | 6/2014 | Cabral |
| 8,804,013 B2 | 8/2014 | Park et al. |
| 9,055,228 B2* | 6/2015 | Kinoshita ............ H04N 5/2357 |
| 9,367,916 B1* | 6/2016 | Paliy ........................ G06T 5/008 |
| 9,386,262 B2 | 7/2016 | Yokoyama |
| 9,392,180 B2 | 7/2016 | Hsu |
| 9,454,810 B2* | 9/2016 | Valdes Lopez ...... H04N 1/4074 |
| 9,699,428 B2 | 7/2017 | Bai |
| 9,740,958 B2 | 8/2017 | Lee et al. |
| 9,948,829 B2* | 4/2018 | Kiser ................... H04N 1/6027 |
| 10,044,952 B2 | 8/2018 | Chesnokov et al. |
| 10,171,786 B2 | 1/2019 | Bai |
| 10,362,247 B2 | 7/2019 | Kim |
| 10,656,406 B2* | 5/2020 | Koga ..................... G06T 5/008 |
| 10,764,149 B2 | 8/2020 | Zhou et al. |
| 10,855,964 B2* | 12/2020 | Cao ........................ H04N 9/643 |
| 2002/0025164 A1 | 2/2002 | Suzuki |
| 2002/0126209 A1 | 9/2002 | Hamada |
| 2005/0179793 A1 | 8/2005 | Schweng |
| 2008/0074515 A1 | 3/2008 | Takane |
| 2008/0204574 A1 | 8/2008 | Kyung |
| 2011/0007969 A1 | 1/2011 | Park |
| 2011/0135216 A1* | 6/2011 | Hatakeyama ........... G06T 5/003 382/260 |
| 2011/0292257 A1* | 12/2011 | Hatakeyama ...... H04N 9/04519 348/242 |
| 2011/0304752 A1 | 12/2011 | Lee |
| 2012/0201450 A1* | 8/2012 | Bryant .................... H04N 1/62 382/162 |
| 2013/0258135 A1 | 10/2013 | Hsu |
| 2015/0030258 A1 | 1/2015 | Chen et al. |
| 2015/0097969 A1* | 4/2015 | Yip ...................... H04N 5/3572 348/187 |
| 2016/0100148 A1* | 4/2016 | Paliy ................... H04N 5/3572 348/242 |
| 2017/0118450 A1* | 4/2017 | Jung ....................... H04N 9/09 |
| 2017/0330308 A1 | 11/2017 | Chen et al. |
| 2019/0297281 A1 | 9/2019 | Toda |
| 2019/0297284 A1 | 9/2019 | Kim |
| 2019/0324268 A1* | 10/2019 | Zhou ...................... G06T 5/007 |

OTHER PUBLICATIONS

U.S. Patent and Trademark Office; Final Rejection; U.S. Appl. No. 15/958,183; dated Oct. 24, 2019.

* cited by examiner

CONTENT ADAPTIVE LENS SHADING CORRECTION METHOD AND APPARATUS

CROSS REFERENCE TO RELATED APPLICATIONS

This application claims priority to Chinese Patent Application No. 202010886575.3 currently entitled "Content Adaptive Lens Shading Correction Method and Apparatus", having inventor JinYun Pan, filed on Aug. 28, 2020, incorporated by reference herein for all purposes.

BACKGROUND OF THE DISCLOSURE

Lens shading correction (LSC) is used to correct for shading of an image caused by various factors relating to photo detectors in the production of a digital image, or other image capture device. Shading, also referred to as vignetting, describes a reduction of an image's brightness and saturation toward the periphery of the image compared to an image center. Lens shading is caused by a number of factors including, but not limited to, lens apertures, lens barrels, sensor chief ray angles and other factors. Also, light transmissivity varies with incident wave length caused by refraction, sensor sensitivity, pixel cross-talk and other factors. As such, both brightness shading and color shading can change the quality of an image. Generally, photo detectors include different color component sensors such as separate red, green and blue pixel sensors. In some implementations, lens shading correction circuits that correct for lens shading employ stored lookup tables with correction values for each pixel of a photo detector. In some implementations, RGB (R/G/G/B) photo detectors are used in image capture devices.

Lens shading can be a difficult problem to correct since shading can vary from image sensor unit to image sensor unit due to sensor variations, lens variations, assembly variations, aging, and other factors. In addition, shading varies from scene to scene such as by the change of the wavelength of light source and objects within a scene. Point to point live video systems that are employed using cellphones, laptops as well as video teleconferencing systems can have severe quality reductions when viewed by a user of a display showing the live video being captured by one or more image capture devices on the other end of the video conference.

Some solutions employ dynamic lens shading correction which relies on an auto white balance mechanism for color temperature prediction but may not always be exact and accurate enough and may not resolve same color of different wavelength issues. Other solutions, sometimes referred to as adaptive lens shading correction techniques, attempt to predict the color temperature according to the image content of the image frame. Such techniques provide high performance in terms of removing the lens shading but can be complex in their implementation.

BRIEF DESCRIPTION OF THE DRAWINGS

The implementations will be more readily understood in view of the following description when accompanied by the below figures, wherein like reference numerals represent like elements, and wherein.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF IMPLEMENTATIONS

Techniques disclosed herein, including methods and apparatus, allow for an efficient and cost-effective adaptive lens shading correction operation through the use of a frequency-based color shading profile. Changes in image content in videos are adaptively corrected for lens shading by correcting for brightness shading and color shading caused by the image capture device. Color shading is corrected using a frequency-based color shading profile based on, in one example, stored hue distribution data for each color component. Very low frequency signals of hue-flat areas of a shaded image are analyzed while high frequency signals are filtered out.

In certain implementations, apparatus and methods for providing adaptive lens shading correction employ a frequency-based color shading profile for each color component that includes color shading parameters including an amplitude parameter and a phase parameter corresponding to hue distributions from experimental shading data based on test images captured by one or more image capture devices. In some implementations the frequency-based color shading profile uses a first order harmonic frequency distribution to use as the basis for determining shading correction parameters for content in a shaded image to correct for color shading in the shaded image. In certain implementations, the method and apparatus store statistics of hue distribution of the different color components that are used to generate the frequency-based color shading profile. In certain examples, this includes storing hue distribution data for each of a plurality of color components corresponding to one or more image capture devices and extracting the frequency distribution of the hue distribution using, for example, the first harmonic of the distribution to determine the shading profile of one or more image capture devices.

In some examples, the method and apparatus removes brightness shading, also referred to as luminance shading and performs a down sampling operation on blocks of pixels of a shaded image as part of a color shading correction operation. For color shading correction, the method and apparatus in some examples detects the color flat areas of the shaded image on a pixel block by pixel block basis based on a hue-flatness thresholds to determine color (hue) flat areas of a shaded image frame. Color un-flat areas, also referred to as hue uneven areas are extracted. Very low frequency signals of hue-flat areas are analyzed while high frequency signals are filtered out. In certain examples, the method includes calculating the frequency-based color shading profile parameters that in one example, include an amplitude parameter and a phase parameter from the experimental shading data and using the color shading parameters to generate correction parameters to remove the shading from the color flat areas in the shaded image and produce an unshaded image. The unshaded image may be compressed and sent to another process, device, network or in some examples provided for display. In some implementations, the shading correction operations are performed in a network such as a cloud based platform.

According to certain embodiments, a method for providing adaptive lens shading correction in at least a portion of a shaded image frame includes performing luminance lens shading correction for a portion of the shaded image frame, detecting a color flat area in the shaded image, generating a frequency-based color shading profile that includes color shading parameters including an amplitude parameter and phase parameter corresponding to hue distributions from experimental shading data based on test images captured by one or more image capture devices, and generating an unshaded image by performing color shading correction on the detected color flat areas of the shaded image frame using the color shading parameters that include the amplitude parameter and the phase parameter corresponding to hue distributions from the experimental shading data. Generating the shading profile may be done online or offline.

In some examples, the hue distributions include stored hue distribution data for each of a plurality of color components corresponding to the one or more image capture devices and wherein detecting the color flat area in the shaded image comprises down sampling the shaded image frame to produce one or more down sampled blocks of pixels of the shaded image frame.

In certain examples, the method includes transforming hue in the color flat areas from a spatial domain to a frequency domain and determining color shading correction parameters based on the generated color shading model parameters of the frequency-based color shading profile and minimizing a sum of hue variances on a per pixel block basis.

In some examples, the generated frequency-based color shading profile f(x,y) is represented as:

$$f(x, y) = g(x) \cdot g(y)$$

$$g(x) = A_1 \sin\left(\frac{2\pi}{W}x + \varphi_1\right)$$

$$g(y) = A_2 \sin\left(\frac{2\pi}{H}x + \varphi_2\right)$$

where f (x, y) is the color shading distribution, g(x), g(y) represent horizontal and vertical directions, A is amplitude, φ is phase, W is the image width and H is the image height.

In certain examples, transforming hue in the color flat areas includes transforming a hue signal detected in the color flat area for a block of pixels into the frequency domain separately for both horizontal and vertical directions and extracting a low frequency part of each directional transformation using a low pass filter. The method includes transforming each resulting low frequency part into a spatial distribution and determining the color shading correction parameters by generating a color shading correction table used to adjust gain control for an image correction circuit to produce the unshaded image.

In some examples, performing luminance lens shading correction includes generating luminance correction table information from the shaded image frame using a precalibration brightness shading table based on experimental testing of one or more image capture devices and applying the luminance correction table information to correct for luminance shading.

According to certain embodiments, an apparatus for providing adaptive lens shading correction in at least a portion of a shaded image frame includes a luminance correction circuit that performs luminance lens shading correction for at least a portion of the shaded image frame. The apparatus includes a hue uneven removal detection circuit that detects a color flat area in the shaded image and a frequency-based color correction circuit that generates a frequency-based color shading profile that includes color shading parameters including an amplitude parameter and phase parameter corresponding to hue distributions from experimental shading data based on test images captured by one or more image capture devices. The frequency-based color correction circuit generates an unshaded image by performing color shading correction on the detected color flat areas of the shaded image frame using the color shading parameters that include the amplitude parameter and the phase parameter corresponding to hue distributions from the experimental shading data.

In some examples, the apparatus includes memory that stores data representing the hue distributions including hue distribution data for each of a plurality of color components corresponding to the one or more image capture devices.

In certain examples, the hue uneven removal detection circuit detects the color flat area in the shaded image by down sampling the shaded image frame to produce one or more down sampled blocks of pixels of the shaded image frame.

In some examples, the frequency-based color correction circuit transforms hue in color flat areas from a spatial domain to a frequency domain and determines color shading correction parameters based on the generated color shading model parameters of the frequency-based color shading profile by minimizing a sum of hue variances.

In certain examples, the frequency-based color correction circuit produces the shading model parameters using the generated frequency-based color shading profile f(x,y) in the form of:

$$f(x, y) = g(x) \cdot g(y)$$

$$g(x) = A_1 \sin\left(\frac{2\pi}{W}x + \varphi_1\right)$$

$$g(y) = A_2 \sin\left(\frac{2\pi}{H}x + \varphi_2\right)$$

where f (x, y) is the color shading distribution, g(x), g(y) represent horizontal and vertical directions, A is amplitude, φ is phase, W is the image width and H is the image height.

In some examples, the frequency-based color correction circuit transforms a hue signal detected in the color flat area for a block of pixels into the frequency domain separately for both horizontal and vertical directions, extracts a low frequency part of each directional transformation using a low pass filter, transforms each resulting low frequency part into a spatial distribution, and generates a color shading correction table used to adjust gain control for an image correction circuit to produce the unshaded image.

In certain examples, the luminance correction circuit performs luminance lens shading correction by generating luminance correction table information from the shaded image frame using a precalibration brightness shading table that is based on experimental testing of one or more image capture devices. The luminance correction circuit applies the luminance correction table information to correct for luminance lens shading.

In some examples, the apparatus includes an image capture device that produces the shaded image frame as part of a video stream, and at least one display, operatively coupled to the frequency-based color correction circuit that displays the unshaded frame. In certain examples, the luminance correction circuit, the hue uneven removal detection circuit and the frequency-based color correction circuit are comprised of a one or more programmed processors.

According to some embodiments, a non-transitory storage medium stores executable instructions that when executed by one or more processors causes the one or more processors to perform luminance lens shading correction for a portion of the shaded image frame according to the methods described herein.

Figure 1:
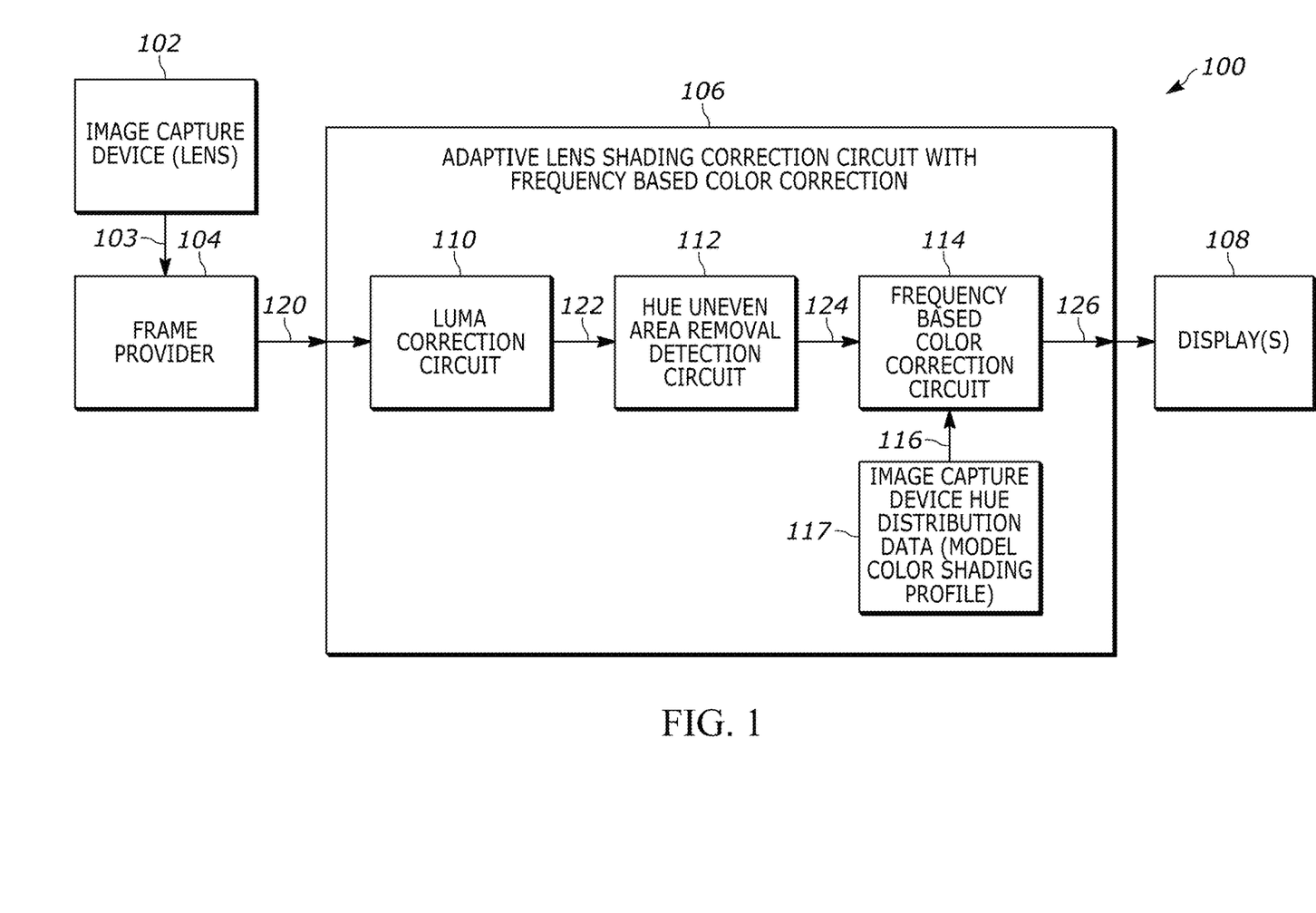
FIG. 1 is a block diagram illustrating an example of an apparatus for providing adaptive lens shading correction in accordance with the disclosure.

FIG. 1 illustrates one example of an apparatus 100 for providing adaptive lens shading correction in at least a portion of a shaded image frame, for example, in a video stream from one or more image capture devices that employ lenses. For example, the video stream may be generated by a video conferencing system, video applications on mobile devices, internet-based video conferencing system or from other sources. The apparatus 100 in this example, includes an image capture device 102 such as a lens system that captures the images 103 but also introduces brightness shading the color shading in the captured images. The captured images 103 are provided to a frame provider 104 such as a preprocessing circuit that performs various noise removal operations or any other suitable operations as desired. However the apparatus 100 in other implementations does not include the image capture device or frame provider and is an intermediary apparatus in a system such as a server in a cloud computing platform that receives shaded image frames from various image sources and performs the lens shading correction and provides the unshaded images to other devices for display. Other variations are contemplated.

The apparatus 100 includes an adaptive lens shading correction circuit 106 that employs frequency-based color correction (and luminance shading correction). The apparatus 100, if desired, includes one or more displays 108 and in other implementations, provides unshaded image frames to a network or other device for further processing such as compression or other operations as desired. In one example, the adaptive lens shading correction circuit 106 is implemented as part of a graphics processing unit (GPU), central processing unit (CPU), accelerated processing unit (APU), application specific integrated circuit (ASIC), discrete logic circuit, one or more state machines, one or more suitably programmed processors that execute instructions that are stored in memory such as read only memory (ROM), random access memory (RAM), non-volatile RAM (NVRAM) or any other suitable memory, or is implemented using other suitable architecture.

In this example, the adaptive lens shading correction circuit 106 includes a luminance correction circuit 110, a hue uneven area removal detection circuit 112, a frequency-based color correction circuit 114 and memory that stores image capture device hue distribution data 116. In certain implementations, the frame provider 104 accumulates frames in one or more frame buffers and provides the shaded image frames 120 to the luminance correction circuit 110 which performs luminance lens shading correction and produces luminance corrected shaded image frames 122 such as in the form of one or more macroblocks of pixels, to the hue uneven area removal detection circuit 112. The hue uneven area removal detection circuit 112, removes hue uneven areas of the luminance corrected shaded image frame 122 to identify color flat areas of the shaded image frame and provides the color flat area blocks 124 (or identification information of the color flat macroblocks) to the frequency-based color correction circuit which generates an unshaded image 126 by performing color shading correction on the detected color flat areas of the shaded image frame using color shading parameters that include an amplitude parameter and phase parameters corresponding to hue distribution data 116. In some implementations the hue uneven area removal detection circuit 112 receives shaded image frames 120 and removes uneven areas.

In certain implementations, the adaptive lens shading correction circuit 106 receives a shaded image frame 120 from the frame provider 104 and removes brightness shading in the shaded image using the luminance correction circuit 110 to produce a luminance corrected shaded image 122. The hue uneven area removal detection circuit 112 detects the color flat area on a macroblock level from the luminance corrected shaded image frame 122 and removes the hue uneven area to produce the color flat area blocks 124 with the flat color area. The frequency-based color correction circuit 114 generates the model color shading profile based on the image capture device hue distribution data 116 and uses the color shading profile parameters, such as amplitude and phase for given frequencies, to determine a level of color compensation to apply to the corresponding frequencies found in the hue flat area blocks 124. The frequencies that are adjusted correspond to the first harmonic frequencies found in the flat area. The color shading is then removed by the frequency-based color correction circuit 114 and the unshaded image 126 is output for subsequent processing or for display on one or more displays 108.

In certain implementations, the adaptive lens shading correction circuit 106 provides adaptive lens shading correction in at least a portion of a shaded image frame and includes the luminance correction circuit 110 that performs luminance lens shading correction for at least a portion of the shaded image frame, the hue uneven removal area detection circuit 112 that detects a color flat area in the shaded image, and the frequency-based color correction circuit 114 that generates a frequency-based color shading profile that includes color shading parameters including an amplitude parameter and phase parameter corresponding to hue distributions from experimental shading data and generates an unshaded image by performing color shading correction on the detected color flat areas of the shaded image frame using the color shading parameters that include the amplitude parameter and the phase parameter corresponding to hue distributions from the experimental shading data.

In some examples, the apparatus includes memory 117 that stores data representing the hue distributions including hue distribution data 116 for each of a plurality of color components corresponding to the one or more image capture devices. In certain examples, the hue uneven area removal detection circuit 112 detects the color flat area in the shaded image by down sampling the shaded image frame to produce one or more down sampled blocks of pixels of the shaded image frame.

In certain examples, the frequency-based color correction circuit 114 produces the shading model parameters using the generated frequency-based color shading profile f(x,y) in the form of:

$$f(x, y) = g(x) \cdot g(y)$$
$$g(x) = A_1 \sin\left(\frac{2\pi}{W}x + \varphi_1\right)$$
$$g(y) = A_2 \sin\left(\frac{2\pi}{H}x + \varphi_2\right)$$

where f x, y is the color shading distribution, x, y represent horizontal and vertical directions, A is amplitude, φ is phase, W is the image width and H is the image height.

In some examples, the frequency-based color correction circuit 114 transforms a hue signal detected in the color flat area for a block of pixels into the frequency domain separately for both horizontal and vertical directions, extracts a low frequency part of each directional transformation using a low pass filter, transform each resulting low frequency part into a spatial distribution and generates a color shading correction table with values used to adjust gain control for an image correction circuit to produce the unshaded image.

In some examples, the frequency-based color correction circuit 114 transforms hue in color flat areas from a spatial domain to a frequency domain and determines color shading correction parameters based on the generated color shading model parameters of the frequency-based color shading profile by minimizing a sum of hue variances.

In certain examples, the luminance correction circuit 110 performs luminance lens shading correction by generating luminance correction table information from the shaded image frame using a luminance shading table 430 (FIG. 4) based on experimental testing of one or more image capture devices using conventional techniques and applying the luminance correction table information 433 to correct for luminance lens shading.

In some examples, the apparatus includes an image capture device that produces the shaded image frame as part of a video stream, and at least one display 108 that displays the unshaded frame. In certain examples, the luminance correction circuit 110, the hue uneven area removal detection circuit 112 and the frequency-based color correction circuit 114 includes one or more programmed processors. More details regarding the various operations are provided below.

Figure 2:
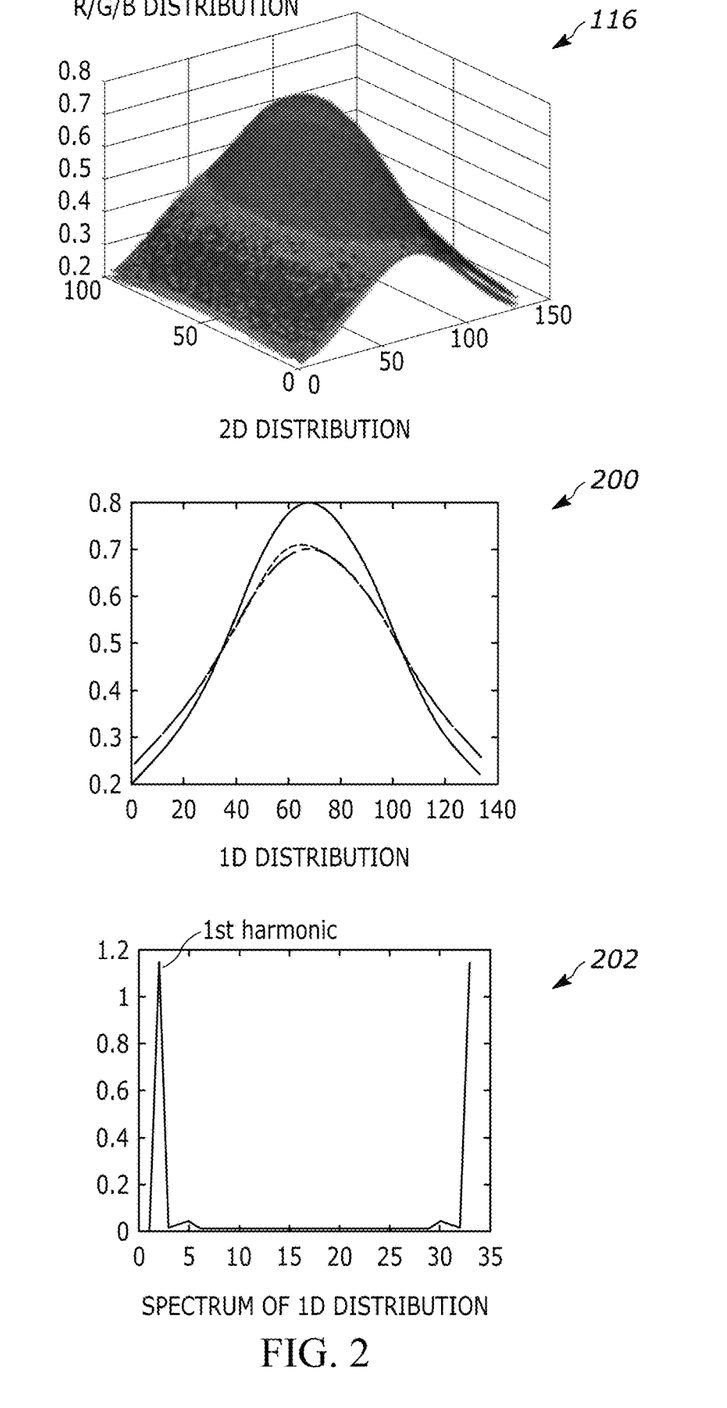
FIG. 2 is a graphical representation of hue distributions from experimental shading data based on test images captured by one or more image capture devices.

FIG. 2 graphically illustrates the image capture device hue distribution data 116. The hue distribution data 116 is generated offline using test images that are captured by the one or more image capture devices. Graph 200 illustrates a one-dimensional distribution of each color component. Graph 202 illustrates the frequency distribution of a one-dimensional distribution of one hue component. It has been discovered that the first harmonic represents a large part of the color shading caused by the lens based on test images captured by one or more image capture devices. In one example, the frequency-based color correction circuit 114 stores the image capture device hue distribution data 116 and generates the first harmonic information for use to generate color shading parameters namely amplitude parameters and phase parameters corresponding to the hue distributions that are used to correct for color lens shading in the shaded image as further described below.

Figure 3:
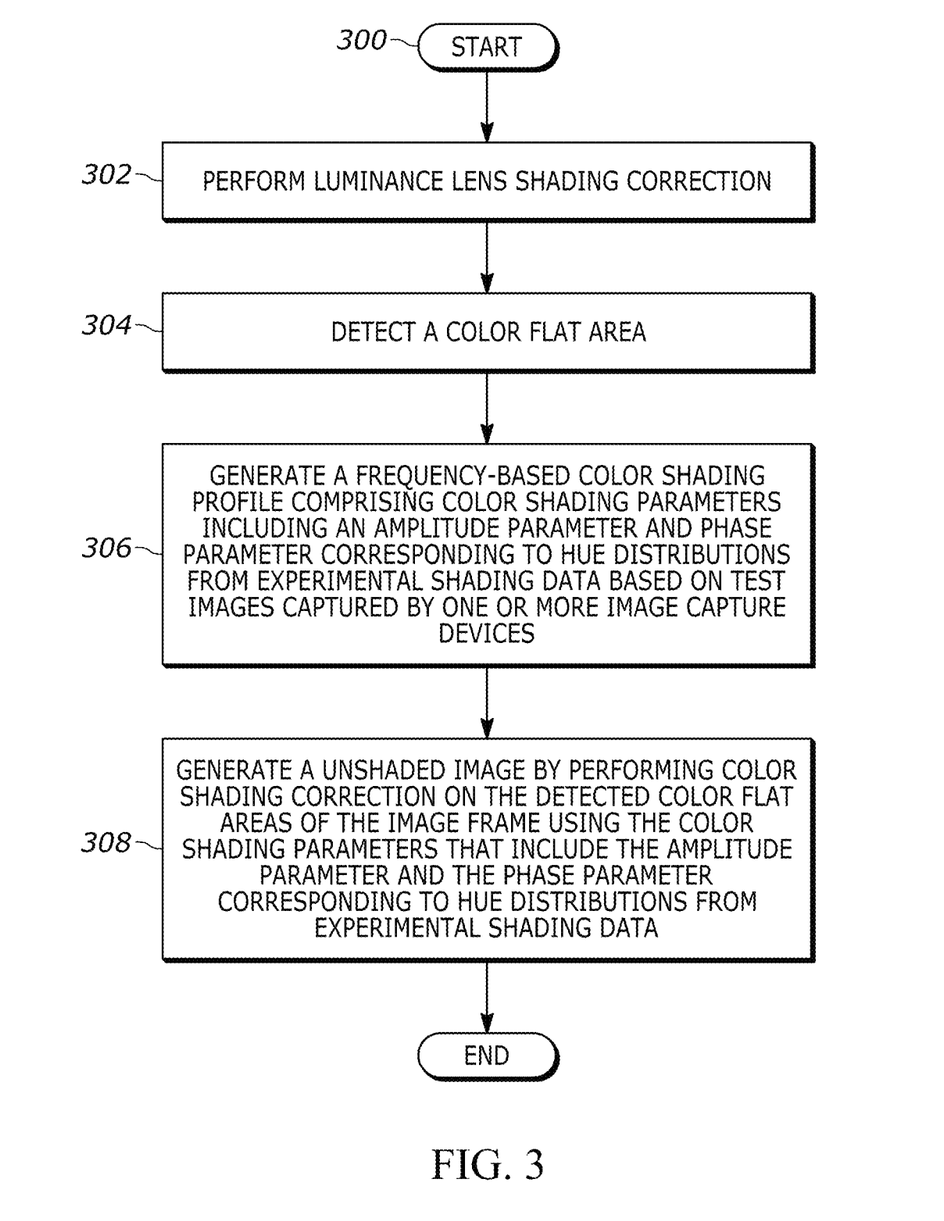
FIG. 3 is a flowchart illustrating a method for providing adaptive lens shading correction in accordance with one example set forth in the disclosure.

FIG. 3 illustrates one example of a method for providing adaptive lens shading correction that in this example is carried out by the adaptive lens correction circuit 106. As shown in block 300, the method begins by, for example, receiving shaded image frames 120 are part of a video stream from a frame provider 104. As shown in block 302, the method includes performing luminance lens shading correction for at least a portion of the shaded image frame such as by the luminance correction circuit 110. In some implementations, performing luminance lens shading correction is done on a per-macroblock basis of an incoming shaded image frame. However, any suitable pixel basis may be used. As such, the method includes removing brightness shading from the shaded image. The brightness shading in some examples includes using any suitable techniques such as preprocessing the image by performing luminance shading correction, demosaic operations and auto white balance (AWB) operations for each color component and other operations as desired.

In some examples, a luminance shading table 430 (FIG. 4) for each color component is employed based on offline experimental testing of the lens to determine the luminance shading caused by the lens which is removed using know techniques. As such, the brightness shading is removed based on calibration information. As shown in block 304, the method includes detecting a color flat area in the shaded image, such as by the hue uneven area removal circuit 112. In one example, this is done on the luminance corrected image frame. In other examples, the color flat area detection is performed on non-luminance corrected images. The detection of the color flat area in certain implementations includes down sampling the shaded image frame to produce one or more down sampled blocks of pixels of the shaded image frame. As shown in block 306, the method includes generating a frequency-based color shading profile that includes the color shading parameters including an amplitude parameter and a phase parameter corresponding to hue distributions from experimental shading data based on test images captured by one or more capture devices. This is done in one example by the frequency-based color correction circuit. The frequency-based color shading profile, for example, is a function that represents on a per-color component basis an amount of color shading that is caused by the lens. In this example, a first harmonic is used as the frequency range corresponding to the color shading caused by the lens.

A spectrum analysis methodology is performed to obtain the characteristic of the shading profile. It has been determined that shading is concentrated in the first harmonics with very little shading occurring in the high frequency band. The color shading profile is represented as:

$$f(x, y) = g(x) \cdot g(y)$$

-continued $$g(x) = A_1 \sin\left(\frac{2\pi}{W}x + \varphi_1\right)$$

$$g(y) = A_2 \sin\left(\frac{2\pi}{H}x + \varphi_2\right)$$

Where f (x, y) is the color shading distribution, g(x), g(y) represent horizontal and vertical directions. W is the image width and H is the image height.

As shown in block 308, the method includes generating, such as by the frequency-based color correction circuit, an unshaded image 126 by performing color shading correction on the detected color flat areas of the shaded image frame, using the color shading parameters that include the amplitude parameter and the phase parameter corresponding to hue distributions from the experimental shading data. The amount of correction to be applied to the different color levels in the scene is determined using the frequency-based color shading profile. In one example, a color correction table is provided to a lens shading correction circuit to correct the gains applied to the various color components for the various pixels in the blocks.

Figure 4:
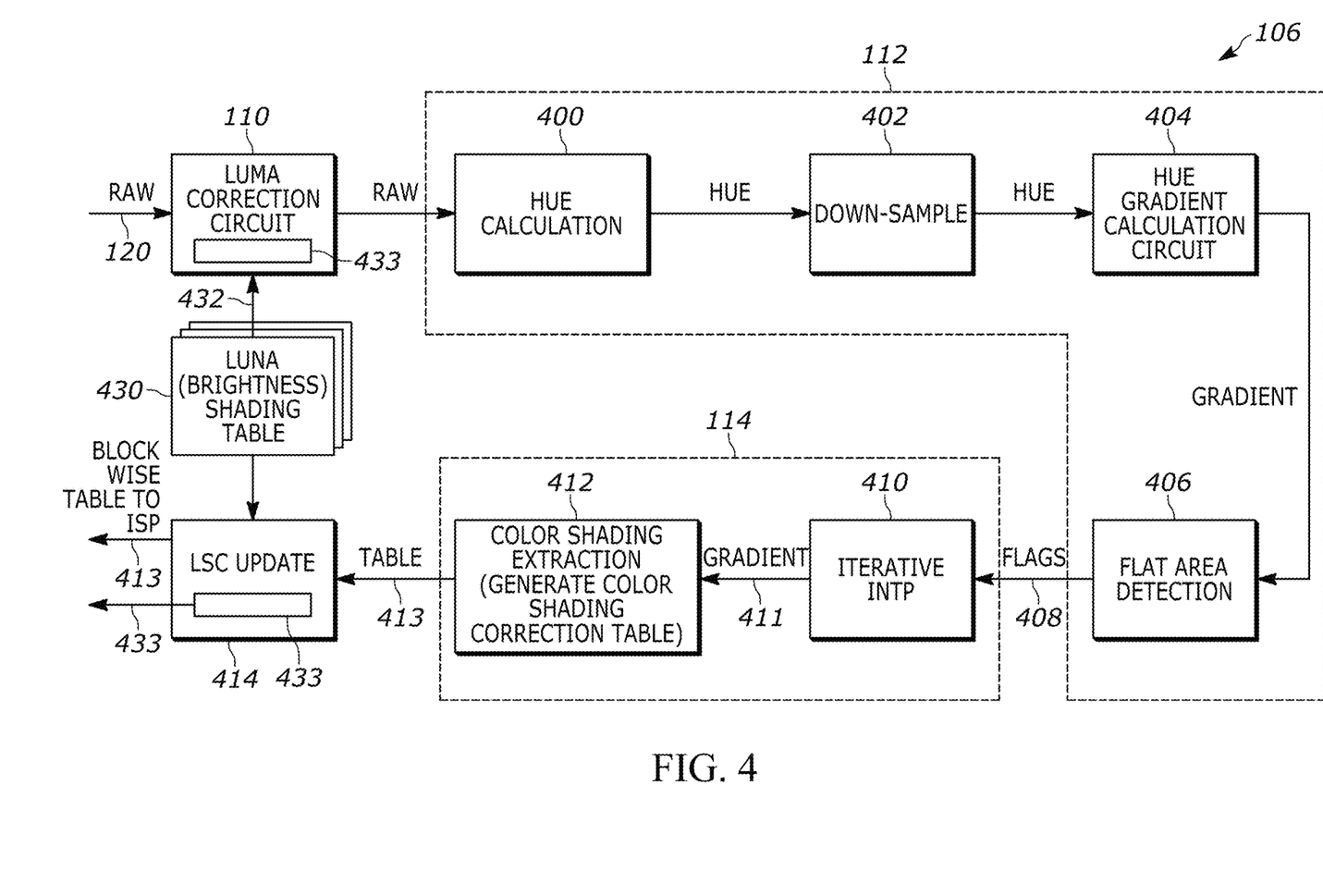
FIG. 4 is a block diagram illustrating an adaptive lens shading correction circuit with frequency-based color correction in accordance with one example set forth in the disclosure.

FIG. 4 is a block diagram illustrating in more detail an example of the adaptive lens correction circuit 106 of FIG. 1. The hue uneven area removal detection circuit 112, in this example, includes a hue calculation circuit 400, a down sample circuit 402, a hue gradient calculation circuit 404 and a flat area detection circuit 406. However it will be recognized that the other blocks shown can also be considered part of the adaptive lens correction circuit and it will be recognized that the various operations of the functional block can be combined or separated as desired.

The hue calculation circuit 400 calculates the ratios of R/G and B/G, which is taken as the hue of whole image. The input is the raw image which only has one color channel for each pixel. A demosaic (interpolation) operation converts the raw image to an RGB full image. The hue calculation circuit 400 then calculate R/G and B/G for each pixel after interpolation. The down sample circuit 402 scales down the shaded image frame (e.g., down samples the frame or macroblocks thereof) and the down sampled shaded image frame is used to determine the hue gradient as shown in block 404. The hue gradient calculation circuit 404 uses thresholds determined through experimental operations to determine that a macroblock is a color flat area. For example, if a hue variance, luminance and adjacent color difference is within the calibrated thresholds, a block is considered a color flat area. Other techniques to detect color flat areas can also be used.

Also, performing luminance lens shading correction by luminance correction circuit 110 includes using luminance correction table information 432 to correct for the luminance shading using a luminance shading table 430 that is based on experimental testing of one or more image capture devices. The method includes applying the luminance shading table 430 to correct for luminance shading using conventional techniques.

Figure 5:
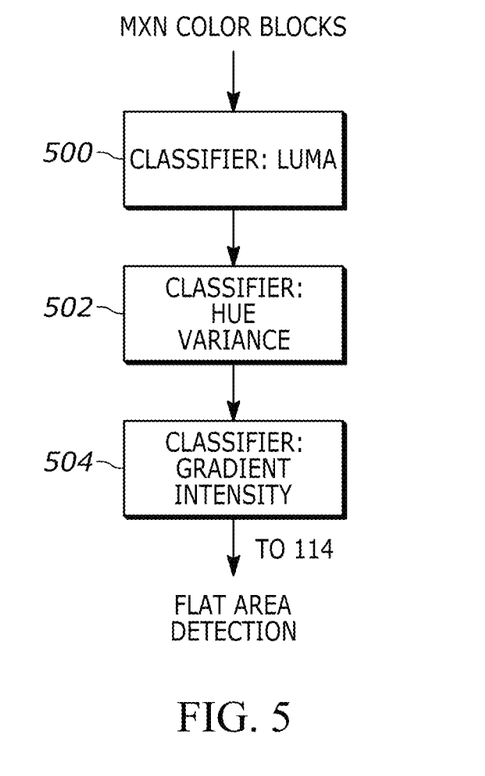
FIG. 5 is a flowchart illustrating a method for providing adaptive lens shading correction in accordance with one example set forth in the disclosure.
Figure 6:
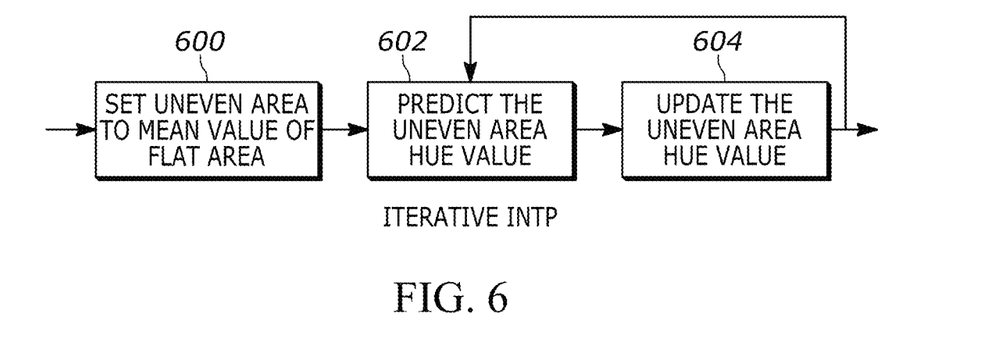
FIG. 6 is a flowchart illustrating a method for providing adaptive lens shading correction in accordance with one example set forth in the disclosure.
Figure 7:
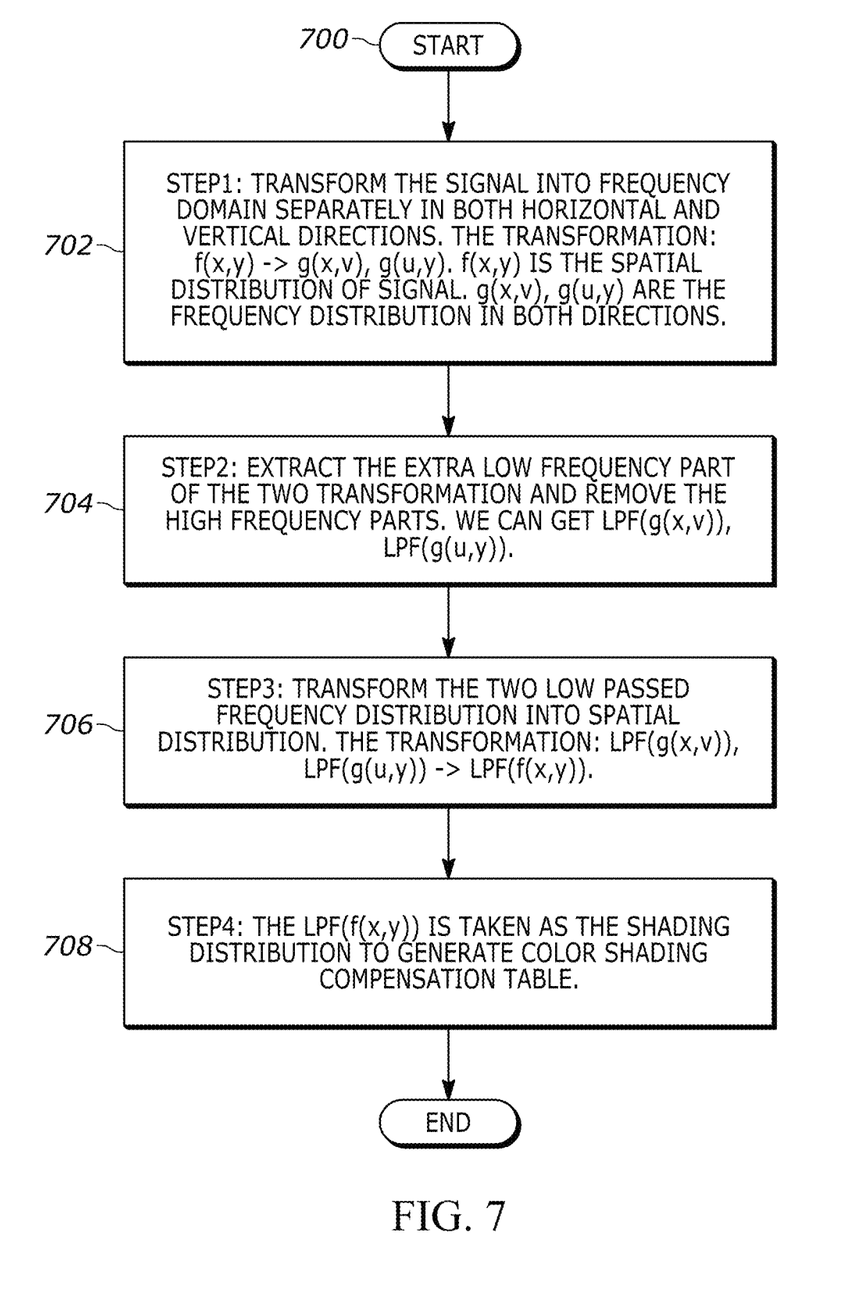
FIG. 7 is a flowchart illustrating a method for providing adaptive lens shading correction in accordance with one example set forth in the disclosure.

Referring also to FIGS. 5-7, an example of the color flat area detection is illustrated wherein a classifier is used to eliminate the hue un-flat areas. In this example, three indicators are used by the classifier, luminance, color variance and adjacent hue gradients information. As illustrated in FIG. 5, the hue uneven area removal detection circuit 112 classifies each M×N color block by its luminance level as shown by block 500, hue variance 502 and gradient intensity 504 based on thresholds that have been experimentally determined to represent levels that correspond to color flat areas. Based on the luminance, color variance and adjacent gradient information within a color block, a color block is determined to be in a color flat area or color un-flat (e.g., uneven) area. Un-flat areas are removed by the flat area detection circuit 406. For example, flat area detection circuit 406 in one example, outputs flags indicating which macroblocks in a shaded frame are flat as shown by data 408. The frequency-based color correction circuit 114 performs color shading correction on the color flat areas of the shaded image.

FIG. 6 illustrates one example of operations of the frequency-based color correction circuit 114 which in this example includes at least an iterative interpolation circuit 410 and the color shading extraction circuit 412. As shown in block 600, the uneven area is set to a mean value of the flat area. As shown in block 602, the frequency-based color correction circuit 114 predicts the uneven area hue value and as shown in block 604, updates the uneven area hue value in an iterative manner. The updated uneven area hue value is then fed back to predict the uneven hue value area until an uneven area hue value for the particular frame and hence scene is determined. The gradient shown as 411 is used by the color shading extraction operation to remove the DC component. The color shading extraction circuit 412 generates the color shading correction table also referred to as a gain table that is used by the lens shading correction update circuit 414 (also referred to as an image correction circuit) which provides a block wise table containing the appropriate gains to correct for the color lens shading (and in some examples for luminance shading). The lens shading correction update circuit merges the luminance shading table 433 and color shading table 413 into one table in a conventional manner. In some examples the color correction shading table 413 (for each color component) is provided to an image signal processor (ISP) which applies the appropriate gains and produces the unshaded image. In other examples, the lens shading correction update circuit 414 applies the gains to produce the unshaded image. In certain implementations, the lens shading correction update circuit includes the ISP.

For example, the color shading extraction circuit 412 transforms hue in the color flat areas from a spatial domain to a frequency domain and determines color shading correction parameters based on the generated color shading model parameters of the frequency-based color shading profile and minimizes a sum of the hue variances. For example, the process begins as shown in block 700 (FIG. 7) and as shown in block 702 the method includes transforming the signal into the frequency domain separately in both horizontal and vertical directions. For example, the transformation: f(x, y)→g(x, v), g(u, y). f(x,y) is the spatial distribution of signal. g(x, v), g(u, y) are the frequency distribution in both directions. As shown in block 704, the method includes extracting the extra low frequency part of the two transformations and removing the high frequency parts to obtain low frequency parts (distributions) LFP(g(x, v)), LPF(g(u, y)) respectively. The gradient information 411 is used to remove the DC component. As part of extracting the extra low frequency part of the hue, the process removes both DC and high frequency components of the distribution. A gradient operation is used to remove the DC component. As shown in block 706, the method includes transforming the two low passed frequency distributions into spatial distributions via the transformation: LPF(g(x, v)), LPF(g(u, y))→LPF(f(x,y)). As shown in block 708, the LPF(f(x,y)) is taken as the shading distribution to generate the values for the color shading compensation table. The corresponding frequency based color shading profile parameters, namely the amplitude parameter and phase parameter from the $1^{st}$ harmonic frequencies in the experimental shading data that correspond to the LPF(f(x,y)) frequencies found in the shaded image are used to compensate for the color shading in the detected LPF(f(x,y)) distribution of the shaded image.

Figure 8:
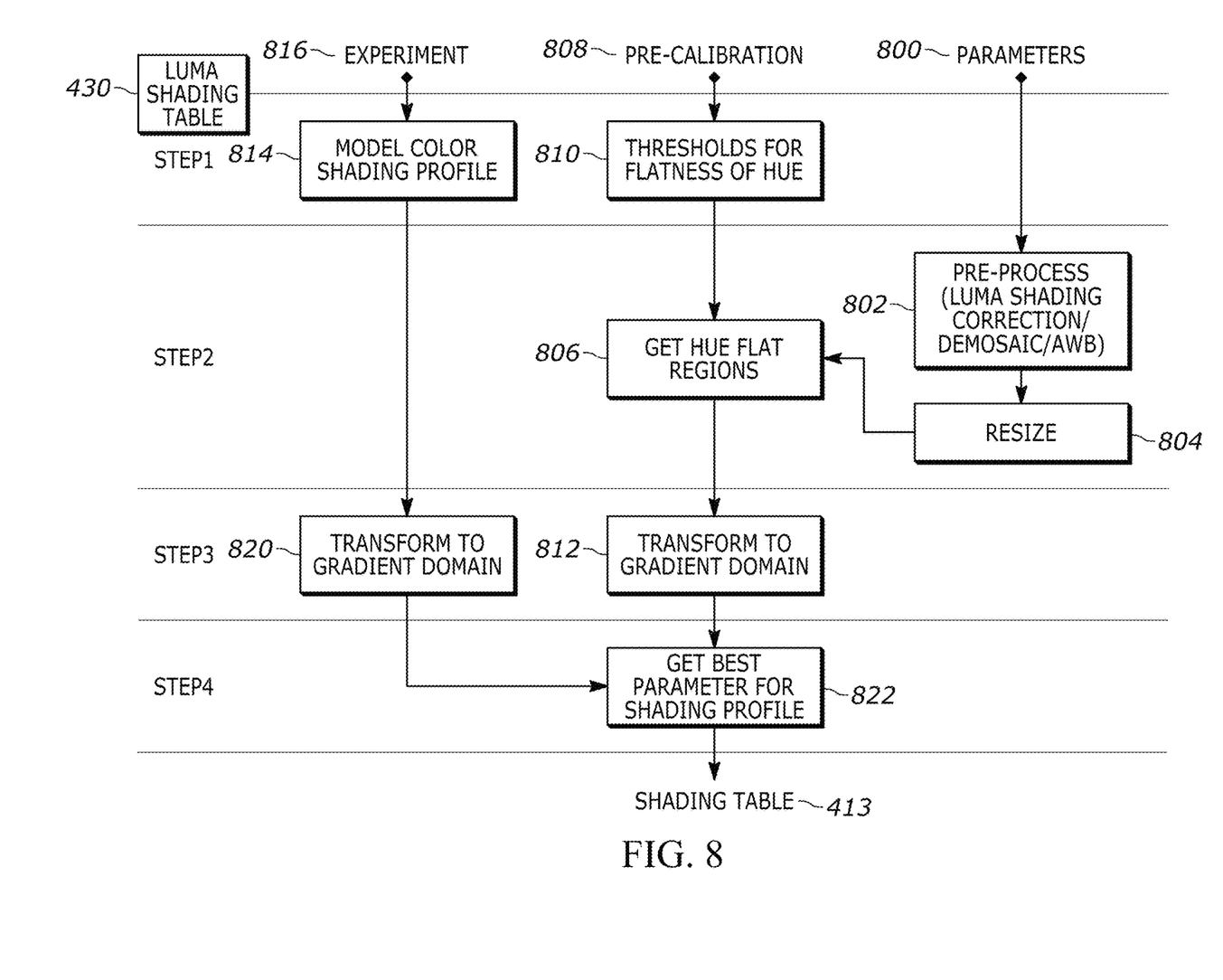
FIG. 8 is a flowchart illustrating a method for providing adaptive lens shading correction in accordance with one example set forth in the disclosure.

FIG. 8 is a block diagram illustrating an example methodology for providing adaptive lens shading correction and illustrates in step 1, the generation of the shading profile and thresholds for the color flat areas is done offline. For example, the thresholds are obtained, in one example, by capturing flatfield images under different illuminants, for several sensors of the same type such as those from the same lenses. The captured raw images are averaged and then analyzed to get the hue distribution data for the color shading profile (see FIG. 2) and thresholds for hue variance, luminance and adjacent color difference. In other examples, the color shading profile is generated online by the apparatus from the stored hue distribution data. In some examples, the frequency-based color shading profile is represented as a function f(x,y) which represents the color shading distribution caused by the image capture device. The apparatus then applies an inverse gain for pixels and in particular color components in the detected frequencies that correspond to the shading profile to correct for the shading caused by the lens. In one example, the shading frequencies of interest are those in the first harmonic of the hue distributions obtained through experimental testing. As shown for step 2, the raw image is analyzed to get hue-flat areas. Also, preprocessing the shaded image through luminance shading correction, interpolation and AWB and resizing the image to a low resolution is performed. This operation identifies the hue-flat area if the hue variance, luminance and adjacent color difference between pixel blocks is within the calibrated thresholds. In step 3, the hue and the color shading profile are transferred to the gradient domains, the transformation allows the elimination of DC component impacts. This can be done by suitable FFT operations. In step 4, the best parameter for the chrominance shading correction parameter is obtained by minimizing the sum of hue variances between the shading profile and each hue-flat block in the gradient domain. This is shown for example in FIG. 6.

As further illustrated, luminance correction parameters 800 are obtained through experimentation and applied in a luminance shading correction process illustrated as luminance shading correction operation 802 such as by luminance correction circuit 110. The luminance corrected macroblocks for a frame are down sampled by down sample circuit 402 as illustrated by block 804 and used to obtain the hue-flat regions of the resized blocks as shown in block 806. A precalibration operation illustrated by 808 is used through experiments to determine thresholds for the flatness of hue as shown in block 810. For example, the hue gradient calculation circuit 404 compares detected hue values in the down sampled image with the threshold and for those blocks or pixels within a block that are, for example, above the hue-flatness threshold are determined to be uneven or non-flat areas and are not used as part of the color correction areas of the image. As shown in block 812, for the hue-flat areas that are found, the frequency-based color correction circuit 114 transforms from the frequency domain to the gradient domain, those blocks of pixels that are determined to be flat areas. As shown by block 814, experimental information 816 is used to determine the model color shading profile corresponding to the lens. In one example, the hue distribution data is stored in memory 216 that resulted from the experiments. The frequency-based color correction circuit 114 then generates the model color profile from the stored hue distribution data. A luminance shading table for each component 430 is also experimentally determined and used by the luminance shading correction operation 802. The luminance shading table 430 is also used to correct for shading on the image as part of the lens shading correction circuit 414. As shown by block 820, the method includes transforming the model color shading profile from the frequency domain to the gradient domain. As shown in block 822, the method includes obtaining the best parameter for the shading profile to put in the shading table. For example, the best correction value at a given x,y location for a given pixel is determined as previously described with respect to FIG. 6.

The apparatus 100 in certain implementations includes one or more processors such as CPUs, GPUs or other processors that execute instructions that are stored in memory such as memory 117 or other suitable memory that when executed, cause the processor to operate as the adaptive lens shading correction circuit 106 as described herein. For example, a non-transitory storage medium includes executable instructions that when executed by one or more processors causes the one or more processors to perform luminance lens shading correction for a portion of the shaded image frame, detect a color flat area in the shaded image, generate a frequency-based color shading profile comprising color shading parameters including an amplitude parameter and phase parameter corresponding to hue distributions from experimental shading data based on test images captured by one or more image capture devices, and generate an unshaded image by performing color shading correction on the detected color flat areas of the shaded image frame using the color shading parameters that include the amplitude parameter and the phase parameter corresponding to hue distributions from the experimental shading data.

In some examples, the non-transitory storage medium includes executable instructions that when executed by the one or more processors causes the one or more processors to store hue distribution data for each of a plurality of color components corresponding to the one or more image capture devices, and detect the color flat area in the shaded image by down sampling the shaded image frame to produce one or more down sampled blocks of pixels of the shaded image frame.

In certain examples, the non-transitory storage medium includes executable instructions that when executed by the one or more processors causes the one or more processors to transform hue in the color flat areas from a spatial domain to a frequency domain and determine color shading correction parameters based on the generated color shading model parameters of the frequency-based color shading profile and minimizing a sum of hue variances.

In some examples, the non-transitory storage medium includes executable instructions that when executed by the one or more processors causes the one or more processors to perform generating the frequency-based color shading profile f(x,y) that is represented as:

$$f(x, y) = g(x) \cdot g(y)$$

$$g(x) = A_1 \sin\left(\frac{2\pi}{W}x + \varphi_1\right)$$

$$g(y) = A_2 \sin\left(\frac{2\pi}{H}x + \varphi_2\right)$$

where f x, y is the color shading distribution, x, y represent horizontal and vertical directions, A is amplitude, φ is phase, W is the image width and H is the image height.

Also, in certain examples, a non-transitory storage medium includes executable instructions that when executed by the one or more processors causes the one or more processors to perform luminance lens shading correction by generating luminance correction table information from the shaded image frame using a precalibration brightness shading table based on experimental testing of one or more image capture devices and applying the luminance correction table information to correct for luminance shading.

Among other technical advantages, the frequency-based color correction technique uses a shading model that is obtained from the frequency features from chrominance shading unlike other techniques that use averages shading. The frequency characteristics of the chrominance shading process described herein provides a more accurate chrominance shading correction resulting in higher quality video images. Also, the disclosed methods and apparatus can employ a low computation load and high execution efficiency as in some examples using down sampled low resolution pixel information. In some implementations, the down sampled pixel block information results in lower memory consumption compared to other adaptive techniques.

Although features and elements are described above in particular combinations, each feature or element can be used alone without the other features and elements or in various combinations with or without other features and elements. The apparatus described herein in some implementations are manufactured by using a computer program, software, or firmware incorporated in a non-transitory computer-readable storage medium for execution by a general-purpose computer or a processor. Examples of computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

In the preceding detailed description of the various embodiments, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized, and that logical, mechanical and electrical changes may be made without departing from the scope of the invention. To avoid detail not necessary to enable those skilled in the art to practice the invention, the description may omit certain information known to those skilled in the art. Furthermore, many other varied embodiments that incorporate the teachings of the disclosure may be easily constructed by those skilled in the art. Accordingly, the present invention is not intended to be limited to the specific form set forth herein, but on the contrary, it is intended to cover such alternatives, modifications, and equivalents, as can be reasonably included within the scope of the invention. The preceding detailed description is, therefore, not to be taken in a limiting sense, and the scope of the present invention is defined only by the appended claims. The above detailed description of the embodiments and the examples described therein have been presented for the purposes of illustration and description only and not by limitation. For example, the operations described are done in any suitable order or manner. It is therefore contemplated that the present invention covers any and all modifications, variations or equivalents that fall within the scope of the basic underlying principles disclosed above and claimed herein.

The above detailed description and the examples described therein have been presented for the purposes of illustration and description only and not for limitation.

What is claimed is:

1. A method for providing adaptive lens shading correction in at least a portion of a shaded image frame comprising:
    performing luminance lens shading correction for a portion of the shaded image frame;
    detecting a color flat area in the shaded image frame;
    generating a frequency-based color shading profile comprising color shading parameters including an amplitude parameter and phase parameter corresponding to hue distributions from experimental shading data based on test images captured by one or more image capture devices; and
    generating an unshaded image by performing color shading correction on the detected color flat areas of the shaded image frame using the color shading parameters.

2. The method of claim 1 wherein;
    the hue distributions are comprised of stored hue distribution data for each of a plurality of color components corresponding to the one or more image capture devices; and
    wherein detecting the color flat area in the shaded image comprises down sampling the shaded image frame to produce one or more down sampled blocks of pixels of the shaded image frame.

3. The method of claim 2 comprising transforming hue in the color flat areas from a spatial domain to a frequency domain and determining color shading correction parameters based on the generated color shading model parameters of the frequency-based color shading profile and minimizing a sum of hue variances.

4. The method of claim 1 wherein the generated frequency-based color shading profile f(x,y) is represented as:

$$f(x, y) = g(x) \cdot g(y)$$
$$g(x) = A_1 \sin\left(\frac{2\pi}{W}x + \varphi_1\right)$$
$$g(y) = A_2 \sin\left(\frac{2\pi}{H}x + \varphi_2\right)$$

where f x, y is the color shading distribution, x, y represent horizontal and vertical directions, A is amplitude, φ is phase, W is the image width and H is the image height.

5. The method of claim 3 wherein transforming hue in the color flat areas comprises:
    transforming a hue signal detected in the color flat area for a block of pixels into the frequency domain separately for both horizontal and vertical directions;
    extracting a low frequency part of each directional transformation using a low pass filter;
    transforming each resulting low frequency part into a spatial distribution; and wherein determining the color shading correction parameters comprises generating a color shading correction table used to adjust gain control for an image correction circuit to produce the unshaded image.

6. The method of claim 1 wherein performing luminance lens shading correction comprises generating luminance correction table information from the shaded image frame using a precalibration brightness shading table based on experimental testing of one or more image capture devices and applying the luminance correction table information to correct for luminance shading.

7. An apparatus for providing adaptive lens shading correction in at least a portion of a shaded image frame comprising:
a luminance correction circuit operative to perform luminance lens shading correction for at least a portion of the shaded image frame;
a hue uneven removal detection circuit operative to detect a color flat area in the shaded image frame;
a frequency-based color correction circuit operative to:
generate a frequency-based color shading profile comprising color shading parameters including an amplitude parameter and phase parameter corresponding to hue distributions from experimental shading data based on test images captured by one or more image capture devices; and
generate an unshaded image by performing color shading correction on the detected color flat areas of the shaded image frame using the color shading parameters.

8. The apparatus of claim 7 comprising memory that stores data representing the hue distributions including hue distribution data for each of a plurality of color components corresponding to the one or more image capture devices.

9. The apparatus of claim 8 wherein the hue uneven removal detection circuit is operative to detect the color flat area in the shaded image by down sampling the shaded image frame to produce one or more down sampled blocks of pixels of the shaded image frame.

10. The apparatus of claim 9 wherein the frequency-based color correction circuit is operative to transform hue in color flat areas from a spatial domain to a frequency domain and determine color shading correction parameters based on the generated color shading model parameters of the frequency-based color shading profile by minimizing a sum of hue variances.

11. The apparatus of claim 10 wherein the frequency-based color correction circuit is operative to produce the shading model parameters using the generated frequency-based color shading profile f(x,y) in the form of:

$$f(x, y) = g(x) \cdot g(y)$$
$$g(x) = A_1 \sin\left(\frac{2\pi}{W}x + \varphi_1\right)$$
$$g(y) = A_2 \sin\left(\frac{2\pi}{H}x + \varphi_2\right)$$

where f x, y is the color shading distribution, x, y represent horizontal and vertical directions, A is amplitude, φ is phase, W is the image width and H is the image height.

12. The apparatus of claim 10 wherein the frequency-based color correction circuit is operative to:
transform a hue signal detected in the color flat area for a block of pixels into the frequency domain separately for both horizontal and vertical directions;
extract a low frequency part of each directional transformation using a low pass filter;
transform each resulting low frequency part into a spatial distribution; and generate a color shading correction table used to adjust gain control for an image correction circuit to produce the unshaded image.

13. The apparatus of claim 7 wherein the luminance correction circuit is operative to performing luminance lens shading correction by generating luminance correction table information from the shaded image frame using a precalibration brightness shading table based on experimental testing of one or more image capture devices and applying the luminance correction table information to correct for luminance lens shading.

14. The apparatus of claim 11 comprising:
an image capture device operative to produce the shaded image frame as part of a video stream, and
at least one display, operatively coupled to the frequency-based color correction circuit and operative to display the unshaded frame.

15. The apparatus of claim 7 wherein the luminance correction circuit, the hue uneven removal detection circuit and the frequency-based color correction circuit are comprised of a one or more programmed processors.

16. A non-transitory storage medium that comprises executable instructions that when executed by one or more processors causes the one or more processors to:
perform luminance lens shading correction for a portion of the shaded image frame;
detect a color flat area in the shaded image;
generate a frequency-based color shading profile comprising color shading parameters including an amplitude parameter and phase parameter corresponding to hue distributions from experimental shading data based on test images captured by one or more image capture devices; and
generate an unshaded image by performing color shading correction on the detected color flat areas of the shaded image frame using the color shading parameters.

17. The non-transitory storage medium of claim 16 comprising executable instructions that when executed by the one or more processors causes the one or more processors to:
store hue distribution data for each of a plurality of color components corresponding to the one or more image capture devices; and
detect the color flat area in the shaded image by down sampling the shaded image frame to produce one or more down sampled blocks of pixels of the shaded image frame.

18. The non-transitory storage medium of claim 17 comprising executable instructions that when executed by the one or more processors causes the one or more processors to transform hue in the color flat areas from a spatial domain to a frequency domain and determine color shading correction parameters based on the generated color shading model parameters of the frequency-based color shading profile and minimizing a sum of hue variances.

19. The non-transitory storage medium of claim 16 comprising executable instructions that when executed by the one or more processors causes the one or more processors to perform generating the frequency-based color shading profile f(x,y) that is represented as:

$$f(x, y) = g(x) \cdot g(y)$$

-continued $$g(x) = A_1 \sin\left(\frac{2\pi}{W}x + \varphi_1\right)$$

$$g(y) = A_2 \sin\left(\frac{2\pi}{H}x + \varphi_2\right)$$

where f x, y is the color shading distribution, x, y represent horizontal and vertical directions, A is amplitude, φ is phase, W is the image width and H is the image height.

20. The non-transitory storage medium of claim 16 comprising executable instructions that when executed by the one or more processors causes the one or more processors to perform luminance lens shading correction by generating luminance correction table information from the shaded image frame using a precalibration brightness shading table based on experimental testing of one or more image capture devices and applying the luminance correction table information to correct for luminance shading.

\* \* \* \* \*